(12) United States Patent
Zhang et al.

(10) Patent No.: US 10,761,869 B2
(45) Date of Patent: Sep. 1, 2020

(54) CLOUD PLATFORM CONSTRUCTION METHOD AND CLOUD PLATFORM STORING IMAGE FILES IN STORAGE BACKEND CLUSTER ACCORDING TO IMAGE FILE TYPE

(71) Applicant: WANGSU SCIENCE & TECHNOLOGY CO., LTD., Shanghai (CN)

(72) Inventors: Shen Zhang, Shanghai (CN); Hong Wang, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 143 days.

(21) Appl. No.: 15/750,105

(22) PCT Filed: Jul. 26, 2017

(86) PCT No.: PCT/CN2017/094496
§ 371 (c)(1),
(2) Date: Feb. 2, 2018

(87) PCT Pub. No.: WO2019/000535
PCT Pub. Date: Jan. 3, 2019

(65) Prior Publication Data
US 2019/0004844 A1    Jan. 3, 2019

(30) Foreign Application Priority Data

Jun. 26, 2017   (CN) .......................... 2017 1 0493602

(51) Int. Cl.
*G06F 9/455*   (2018.01)
*H04L 29/08*   (2006.01)
(Continued)

(52) U.S. Cl.
CPC ........ *G06F 9/45558* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS 8,352,941 B1    1/2013  Protopopov et al.
8,495,512 B1 *  7/2013  Lappas ............... G06F 9/45558
                                                       715/764
(Continued)

FOREIGN PATENT DOCUMENTS

CN    102932415 A      2/2013
CN    102932415 B *    4/2015

OTHER PUBLICATIONS

The European Patent Office (EPO) The Extended European Search Report for PCT/CN2017/094496 dated Oct. 26, 2018 8 Pages.

*Primary Examiner* — Abu Zar Ghaffari
(74) *Attorney, Agent, or Firm* — Anova Law Group, PLLC

(57) ABSTRACT

The present disclosure provides a cloud platform and a construction method thereof. The cloud platform includes a plurality of compute nodes and at least two storage backends. The construction method includes: establishing an association relationship between the compute nodes and the at least two storage backends, such that each compute node is associated with one and only one storage backend. Different storage backends are associated with different compute nodes. When the compute node generates an image file, a type of the image file is determined. The type of the image file includes a base image file or an exported image file. The image file is stored according to the type of the image file and the storage backend associated with the compute node
(Continued)

that generates the image file. The technical solutions of the present disclosure enhance the overall disaster tolerance and stability of the cloud platform.

13 Claims, 2 Drawing Sheets

(51) Int. Cl.
G06F 3/06 (2006.01)
G06F 9/50 (2006.01)
G06F 8/61 (2018.01)

(52) U.S. Cl.
CPC .............. *G06F 3/0629* (2013.01); *G06F 9/50* (2013.01); *H04L 67/1097* (2013.01); *G06F 8/63* (2013.01); *G06F 2009/45575* (2013.01); *G06F 2009/45579* (2013.01); *G06F 2009/45595* (2013.01)

(56) References Cited

U.S. PATENT DOCUMENTS

| | | | | |
|---|---|---|---|---|
| 8,601,226 B1* | 12/2013 | Lappas | ................ | G06F 9/5077 |
| | | | | 711/162 |
| 8,793,684 B2* | 7/2014 | Breitgand | ............ | G06F 9/45558 |
| | | | | 718/1 |
| 9,009,705 B2* | 4/2015 | Kundu | .................... | G06F 9/455 |
| | | | | 718/1 |
| 9,058,196 B2* | 6/2015 | Baron | ................. | G06F 9/45558 |
| 9,537,745 B1* | 1/2017 | Halcrow | ................. | G06F 9/455 |
| 9,858,105 B1* | 1/2018 | Upadhyay | ............ | G06F 9/45558 |
| 10,007,445 B2* | 6/2018 | Nithrakashyap | .... | H04L 61/2007 |
| 10,310,880 B2* | 6/2019 | Simoncelli | .......... | G06F 9/45558 |
| 10,379,922 B1* | 8/2019 | Bell | ...................... | G06F 11/0712 |
| 2010/0107163 A1* | 4/2010 | Lee | ........................... | G06F 8/61 |
| | | | | 718/1 |
| 2011/0265082 A1* | 10/2011 | Ashok | ....................... | G06F 8/63 |
| | | | | 718/1 |
| 2012/0096461 A1* | 4/2012 | Goswami | ............ | G06F 9/45558 |
| | | | | 718/1 |
| 2012/0278295 A1* | 11/2012 | Hildebrand | ......... | G06F 9/45558 |
| | | | | 707/705 |
| 2014/0282518 A1* | 9/2014 | Banerjee | ............. | G06F 9/45533 |
| | | | | 718/1 |
| 2014/0289105 A1* | 9/2014 | Sirota | .................. | G06Q 20/145 |
| | | | | 705/39 |
| 2016/0019317 A1* | 1/2016 | Pawar | .................. | G06F 16/907 |
| | | | | 707/649 |
| 2016/0026492 A1* | 1/2016 | Son | ........................ | G06F 3/0604 |
| | | | | 718/1 |
| 2016/0077863 A1* | 3/2016 | Karve | ..................... | G06F 9/455 |
| | | | | 718/1 |
| 2016/0125059 A1* | 5/2016 | Jain | ......................... | G06F 3/067 |
| | | | | 707/639 |
| 2016/0162308 A1* | 6/2016 | Chen | ................... | G06F 9/45558 |
| | | | | 718/1 |
| 2017/0004047 A1* | 1/2017 | Deshmukh | .......... | G06F 11/1448 |
| 2017/0024260 A1* | 1/2017 | Chandrasekaran | ... | G06F 9/5088 |
| 2017/0123675 A1* | 5/2017 | Glazemakers | ........ | G06F 3/0619 |
| 2017/0223117 A1* | 8/2017 | Messerli | ................ | G06F 9/5072 |
| 2017/0235761 A1* | 8/2017 | Bafna | ....................... | G06F 8/65 |
| | | | | 707/827 |

* cited by examiner

CLOUD PLATFORM CONSTRUCTION METHOD AND CLOUD PLATFORM STORING IMAGE FILES IN STORAGE BACKEND CLUSTER ACCORDING TO IMAGE FILE TYPE

CROSS-REFERENCE TO RELATED APPLICATIONS

This application is a national phase entry under 35 U.S.C § 371 of International Application No. PCT/CN2017/094496 filed on Jul. 26, 2017, which claims priority of Chinese Patent Application No. 201710493602.9, filed with the State Intellectual Property Office of P. R. China on Jun. 26, 2017, the entire contents of all of which are incorporated herein by reference.

FIELD OF THE DISCLOSURE

The present disclosure generally relates to the field of Internet technology and, more particularly, relates to a cloud platform construction method and a cloud platform.

BACKGROUND

As the Internet technology constantly advances, cloud computing is gradually replacing traditional computing methods due to advantages of its high efficiency, convenience, and configurability, etc. Currently, cloud computing systems are often built by using OpenStack architecture. Through providing compute service (nova), networking service (neutron), block storage service (cinder), image service (glance), and identity service (keystone), etc., OpenStack can serve as a management middleware.

To build a complete cloud computing system, OpenStack is often configured with corresponding underlying services. Currently, a storage backend can be built based on the Ceph system to cooperate with OpenStack block storage service, thereby providing support for the compute service to store and retrieve the virtual machine image.

In the existing technology, the cloud computing system is often merely configured with a single storage backend. Virtual machine image files of compute nodes may be stored in the single storage backend. However, using a single storage backend often has the following problems.

1. Once the storage backend breaks down, all compute nodes may collapse. Thus, the system disaster tolerance may be low.

2. As the amount of data constantly increases, the storage backend may eventually need to scale-out. The current scale-out method is adding more storage nodes to the storage backend. However, in practical applications, this scale-out method may sometimes cause the virtual machines in the compute nodes to collapse, and the system stability is also relatively poor.

BRIEF SUMMARY OF THE DISCLOSURE

The embodiments of the present disclosure are to provide a cloud platform construction method and a cloud platform to enhance the overall disaster tolerance and stability of the cloud platform.

To solve the issues in existing technology, one aspect of the present disclosure provides a construction method for a cloud platform, where the cloud platform includes a plurality of compute nodes and at least two storage backends, the construction method comprising:

establishing an association relationship between the compute nodes and the at least two storage backends, such that each compute node is associated with one and only one storage backend.

In one embodiment, the method includes: configuring at least one virtual machine in each compute node;

when a virtual machine of a compute node generates an image file, determining a type of the image file, where the type of the image file includes a base image file or an exported image file; and storing the image file according to the type of the image file and the storage backend associated with the compute node that generates the image file.

In one embodiment, the storage backends are configured with availability_zones, and correspondingly, establishing the association relationship between the compute nodes and the at least two storage backends includes:

allocating the compute nodes to the availability_zones, such that each compute node has one and only one availability_zone; and assigning a parameter of each availability_zone to the respective compute node.

In one embodiment, the method further includes:

when the number of storage backends is greater than two, combining every two storage backends, and configuring a different availability_zone for the combined storage backend.

In one embodiment, the method further includes:

when a pre-configured compute node in a certain availability_zone generates a virtual-machine-changing-compute-node operation, selecting a changeable target compute node from the availability_zone;

changing the virtual machine that generates the virtual-machine-changing-compute-node operation from the pre-configured compute node to the target compute node.

In one embodiment, storing the image file includes:

when the image file is a base image file, storing the image file in every storage backend.

In one embodiment, before storing the image file in every storage backend, the method further includes:

adding an availability_zone attribute to the base image file, and configuring a value of the availability_zone attribute to be none.

In one embodiment, the method further includes:

when creating a virtual machine according to a designated image file, configuring a filter in compute service, where the filter is used to determine a type of the designated image file;

when the designated image file is a base image file, selecting any compute node, and creating a virtual machine by the selected compute node;

when the designated image file is an exported image file, selecting a compute node that has the same availability_zone parameter as the availability_zone parameter of the designated image file, and creating a virtual machine by the selected compute node.

In one embodiment, storing the image file includes:

when the image file is an exported image file, determining a storage backend associated with the compute node that generates the image file, and storing the image file in the determined storage backend.

In one embodiment, before storing the image file in the determined storage backend, the method further includes:

determining a parameter of the availability_zone corresponding to the compute node that generates the image file; and adding an availability_zone attribute to the image file, and configuring a value of the availability_zone attribute to be the parameter of the availability_zone.

In one embodiment, the method further includes:

when the compute node creates a virtual machine and generates the image file, canceling a step at the compute node for verifying whether an identity of the storage backend corresponding to the compute node is consistent with an identity of the storage backend included in a designated field of the utilized image in the image service.

In one embodiment, the method further includes:

when an operation to export the image file is executed to the virtual machine, obtaining a size information of the exported image file by the compute service corresponding to the compute node which the virtual machine is running on, and sending the size information to the image service by the compute service.

Another aspect of the present disclosure provides a cloud platform, where the cloud platform includes a plurality of compute nodes and at least two storage backends, and each compute node is configured with at least one virtual machine. The cloud platform includes:

an association relationship establishment unit, configured to establish an association relationship between the compute nodes and the at least two storage backends, such that each compute node is associated with one and only one storage backend;

an image file type determination unit, configured to, when an image file is generated by a virtual machine in the compute node, determine a type of the image file, where the type of the image file includes a base image file or an exported image file; and an image file storage unit, configured to store the image file according to the type of the image file and the storage backend associated with the compute node that generates the image file.

In one embodiment, each storage backend is configured with an availability_zone, and correspondingly, the association relationship establishment unit includes:

an availability_zone allocation module, configured to allocate the compute nodes into respective availability_zones, such that each compute node is allocated into one and only one availability_zone; and a parameter assignment module, configured to assign a parameter of each availability_zone to the respective compute node.

In one embodiment, the cloud platform further includes:

a target compute node determination unit, configured to select a changeable target compute node in the availability_zone, when the pre-configured compute node in the target availability_zone generates a virtual-machine-changing-compute-node operation; and a change unit, configured to change the virtual machine that generates the virtual-machine-changing-compute-node operation from the pre-configured compute node to the target compute node.

In one embodiment, the image file storage unit includes:

a base image file storage module, configured to, when the image file is a base image file, store the image file in every storage backend; and an exported image file storage module, configured to, when the image file is an exported image file, determine a storage backend associated with the compute node that generates the exported image file, and store the image file in the determined storage backend.

In one embodiment, the cloud platform further includes:

a type determination unit, configured to determine a type of the designated image file when a virtual machine is created according to the designated image file; and a virtual machine creation unit, configured to, when the designated image file is a base image file, select a compute node, and create a virtual machine by the selected compute node; and when the designated image file is an exported image file, select a compute node that has the same availability_zone parameter as the availability_zone parameter of the designated image file, and create a virtual machine by the selected compute node.

As such, the technical solutions provided by the present disclosure may configure at least two storage backends in the cloud platform, such that, when one of the storage backends fails, other storage backends may continue to operate normally to enhance the disaster tolerance of the cloud platform. In the cloud platform having at least two storage backends, the compute nodes may first be associated with different storage backends, such that each storage backend may correspond to compute node(s), respectively. When the compute node generates an image file, a specific type of the image file may be determined, and the image file may be stored differently according to the image file type. Specifically, in one embodiment, when the image file is a base image file, the image file may be stored in every storage backend. When the image file is an exported image file, the image file may be stored in the storage backend associated with the compute node that generates the exported image file. The purpose of such process is that the base image only includes the operating system in the ex-factory state from which any compute node may create a virtual machine, which results in the necessity to store the base image in every storage backend. The exported image file may include state of a certain user of the operating system running in the virtual machine. The exported image file may be stored in the storage backend associated with the compute node that generates the virtual machine, such that when a virtual machine having the same state as the exported image file needs to be created, the exported image file may be used and a compute node associated with the same storage backend may be selected, to create the new virtual machine. Thus, the exported image file may only be stored in one storage backend. Based on this, through adding additional storage backends, the disaster tolerance of the cloud platform may be enhanced, and the storage capacity scale-out of the cloud platform made possible through adding new storage backends may not affect the online running virtual machines. Thus, the stability of the cloud platform may be ensured.

BRIEF DESCRIPTION OF THE DRAWINGS

To more clearly illustrate the technical solutions of the present disclosure, the accompanying drawings to be used in the description of the disclosed embodiments are briefly described hereinafter. Obviously, the drawings described below are merely some embodiments of the present disclosure. Other drawings derived from such drawings may be obtained by a person having ordinary skill in the art without creative labor.

DETAILED DESCRIPTION

The objectives, technical solutions, and advantages of the present disclosure will become clearer from the following description of the embodiments of the present disclosure when taken in conjunction with the accompanying drawings.

Embodiment 1

The cloud platform of multiple storage backends provided by the present disclosure may include compute nodes and at least two storage backends. The compute node may be physical equipment having a data processing function. To fully utilize CPU, memory, and other resources of the compute node, the compute node may run zero or a plurality of virtual machines. The virtual machine may have its own operating system to handle different computing tasks.

In one embodiment, the compute node may operate based on OpenStack architecture. The compute node may correspond to a sub-service (nova-compute) of the compute service. When a virtual machine runs on the compute node, an image file for a certain user mode of the running virtual machine may be obtained through an image exporting operation.

In one embodiment, the storage backend may operate based on Ceph file system. The storage backend may have a distributed architecture including a plurality of storage nodes. The storage nodes may be physical devices having a data storage function.

Figure 1:
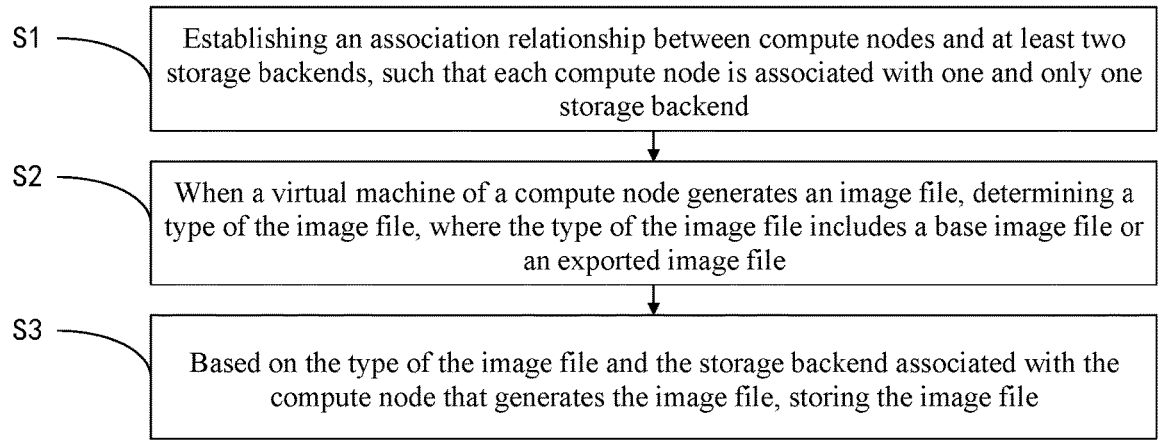
FIG. 1 illustrates a flow chart of an exemplary cloud platform according to Embodiment 1 of the present disclosure.

Referring to FIG. 1, in one embodiment, the construction method for a cloud platform having multiple storage backends may include the following steps.

Step S1: establishing an association relationship between compute nodes and at least two storage backends, such that each compute node is associated with one and only one storage backend.

In one embodiment, because at least two storage backends are included, each storage backend may be associated with corresponding compute node(s). In practical applications, each storage backend may correspond to its own availability_zone. To differentiate different availability_zones, each availability_zone may be pre-configured with a corresponding parameter. The parameter may be a numerical value, or a character string, which is not limited by the present disclosure. For example, when two storage backends are currently included, the two storage backends may correspond to two availability-zones having parameters "AZ1" and "AZ2", respectively.

In one embodiment, the compute nodes may be allocated into different availability_zones. Different availability_zones may correspond to different compute nodes. Specifically, through OpenStack compute service commands, a corresponding parameter may be configured for each compute node. The parameter configured for the compute node may be one of the parameters corresponding to the current storage backends. For example, the parameters for the two current storage backends are "AZ1" and "AZ2", respectively. Then the parameter configured for the compute node may be either "AZ1" or "AZ2". It should be noted that one compute node may only have one parameter. Thus, different compute nodes may be associated with different storage backends. As such, by allocating the parameter of each availability_zone to the respectively associated compute nodes, allocation of the compute nodes may be realized.

Figure 2:
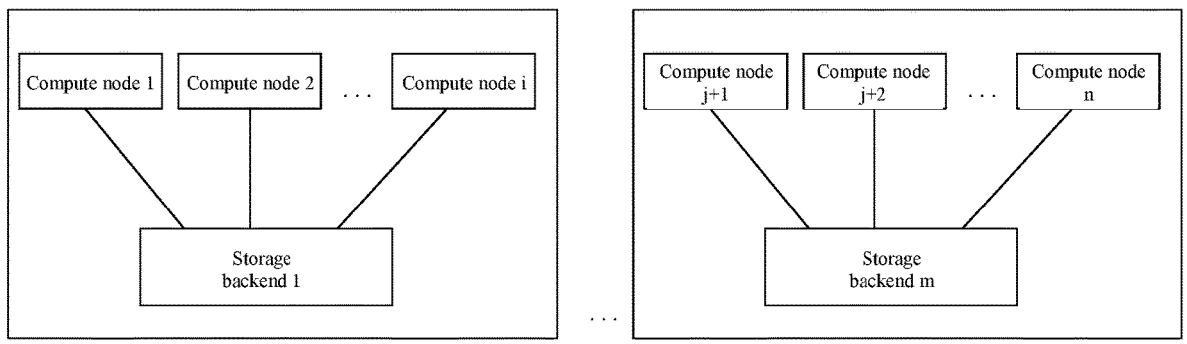
FIG. 2 illustrates a schematic diagram of exemplary association relationship between the compute nodes and the storage backends according to Embodiment 1 of the present disclosure.

Referring to FIG. 2, in one practical application example, there are m number of storage backends and n number of compute nodes. The parameters of the availability_zones corresponding to the m number of the storage backends may be AZ1, AZ2, . . . , and AZm, respectively. As shown in FIG. 2, the n number of the compute nodes may be associated with the corresponding storage backends. The compute nodes in the same storage backend may have the same parameter. For example, the parameter for the compute node 1 to compute node i in the storage backend 1 may all be "AZ1".

In one embodiment, after the step S1, the construction method may further include the following.

Step S2: when a virtual machine of a compute node generates an image file, determining a type of the image file, where the type of the image file includes a base image file or an exported image file.

In one embodiment, the virtual machine of the compute node may generate an image file. Specifically, the image file may be a base image file or an exported image file. The base image file may refer to an image file produced by a native operating system (e.g., Centos7 and Windows2012, etc.) The base image file may include a factory installed operating system, and may not include any user customized configuration (e.g., installed software and executed program, etc.) The exported image file may refer to an image file obtained through performing an image exporting operation on the running virtual machine. Because the exported image file is generated by the running virtual machine, the exported image file may often correspond to a system operating state.

In one embodiment, because the base image file or the exported image file are different, the storage methods for the base image file or the exported image file may be different. Based on this, when an image file is generated in the compute node, a type of the image file may be determined firstly.

Step S3: based on the type of the image file and the storage backend associated with the compute node that generates the image file, storing the image file.

In one embodiment, the base image file does not include an operating state of the operating system, and any one of the compute nodes may create a virtual machine. Thus, the base image file may need to be stored in every storage backend. The exported image file includes a system operating state of the virtual machine. Thus, only the compute node associated with the same storage backend may create a virtual machine based on the exported image file, and the exported image file may only be stored in one of the storage backends.

In one embodiment, when the image file is a base image file, the image file may be stored in every storage backend. Specifically, in the image service (glance), an availability_zone attribute may be added to the image file, and the value of the availability_zone attribute may be configured to none. The value of the availability_zone attribute being none may indicate that no availability_zone is assigned to the image file, and the image file needs to be stored in every storage backend.

In one embodiment, when the image file is an exported image file, a storage backend associated with the compute node that generates the image file may be determined, and the image file may be stored in the determined storage backend. For example, when the compute node in the availability_zone AZ1 generates the exported image file, the exported image file may be stored in the storage backend having the parameter of AZ1, and no copy of the image may be stored in any other storage backend. Specifically, a parameter of the availability_zone corresponding to the compute node that generates the image file may be determined, an availability_zone attribute may be added to the image file by the image service (glance), and the value of the availability_zone attribute may be configured to a parameter of the determined availability_zone. For example, after the compute node in the availability_zone AZ1 generates the exported image file, the compute service may add an availability_zone attribute to the exported image file, and may configure the value of the availability_zone attribute to be AZ1.

As such, in one embodiment, the availability_zone attribute of the base image file may be none, and the operation and maintenance personnel may prepare a copy of the base image file at each storage backend when the cloud platform goes online. Thus, the base image file may be used to create a virtual machine by any compute node. Further, the value of the availability_zone attribute of the exported image file may not be none, and a copy of the exported image file may be stored in a storage backend having the same availability_zone parameter. Thus, the exported image file may be used to create a virtual machine by the compute node associated with the same storage backend. In this way, the exported image file may often be stored in one of the storage backends.

It should be noted that, in practical applications, to increase the storage capacity of the storage backends, when there are more than two storage backends, every two storage backends may be combined and may be configured with a different availability_zone. Thus, in one embodiment, the method may further include steps of combining at least two storage backends into one storage backend and configuring an availability_zone for the combined storage backend.

Figure 3:
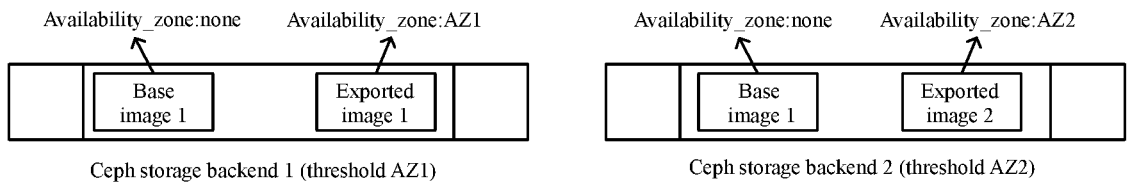
FIG. 3 illustrates a schematic diagram showing storage of an image file according to Embodiment 1 of the present disclosure.
Figure 4:
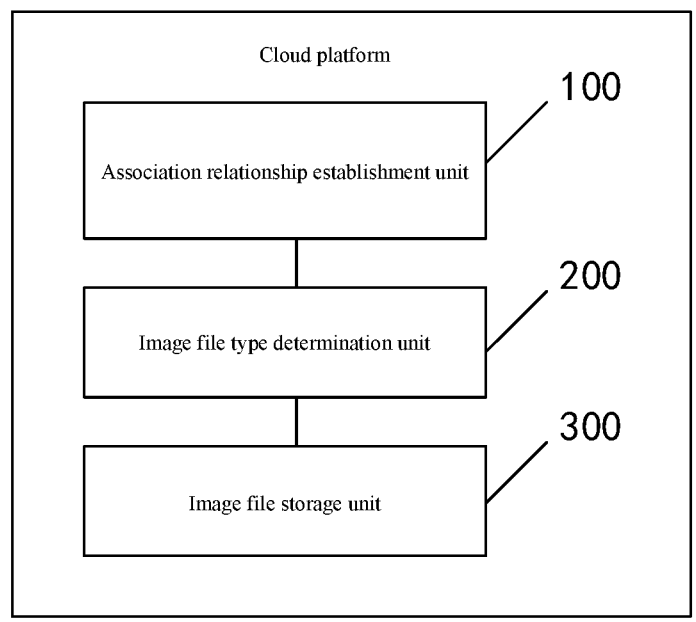
FIG. 4 illustrates a schematic diagram of functional modules of an exemplary cloud platform according to Embodiment 2 of the present disclosure.

Referring to FIG. 3, in one practical application example, two current storage backends may have parameters AZ1 and AZ2, respectively. The base image file 1 may be stored in both the storage backend having the parameter AZ1 and the storage backend having the parameter AZ2 (by the operation and maintenance personnel before the cloud platform goes online). The exported image file 1 generated by the compute node having the parameter AZ1 may only be stored in the storage backend having the parameter AZ1 (by a user through the online cloud platform operation). Similarly, the exported image file 2 generated by the compute node having the parameter AZ2 may only be stored in the storage backend having the parameter AZ2.

In one embodiment, after an association relationship between the compute nodes and the at least two storage backends is established, the operation of fixing availability_zone may be performed on the virtual machine that may cause a change of the compute node. Specifically, the objective of fixing the availability_zone is to confine the change of the compute node within the availability_zone where the compute node belongs. In other words, when a certain virtual machine is required to change from one compute node to another compute node, the compute node before the change and the compute node after the change shall belong to the same availability_zone.

In one embodiment, the operations on the virtual machine that may cause the change of the compute node may include alteration of the configuration, cold migration, live migration, evacuation, and suspend cancellation, etc. Specifically, when a pre-configured compute node in a target availability_zone generates a virtual-machine-change operation, a target compute node may first be determined in the target availability_zone. Then, the virtual machine that generates the virtual-machine-change operation may change from the pre-configured compute node to the target compute node. Thus, it is ensured that the compute node before the change and the compute node after the change belong to a same availability_zone.

In one embodiment, the method for determining a target compute node in a target availability_zone may include randomly selecting a compute node that is different from the pre-configured compute node from the target availability_zone, and making the selected compute node as the target compute node. Obviously, to ensure the normal operation of the virtual machine after the change, the compute nodes in the target availability_zone other than the pre-configured compute node may be sorted according to the currently remaining CPU resources and memory resources, and the compute node that has the most remaining CPU resources and the memory resources may be selected as the target compute node.

In one embodiment, a filter may be added to the scheduler of compute service (nova). When a virtual machine is created according to a designated image file, the filter may match the availability_zone of the compute node with the availability_zone of the designated image file. Specifically, a type of the designated image file may first be determined. When the designated image file is a base image file, it indicates that all storage backends store a copy. Under such situation, any compute node may be selected, and the virtual machine may be created by the selected compute node. However, when the designated image file is an exported image file, it indicates that only one certain storage backend stores a copy. Under such situation, a compute node that has the same availability_zone parameter as the availability_zone parameter of the designated image file may be selected, and the virtual machine may be created by the selected compute node. For example, the designated image file may be an exported image file. The compute service may look up and determine the availability_zone parameter of the exported image file to be AZ1. Under such situation, a compute node may be selected from the compute nodes that have the parameter of AZ1, and the virtual machine may be created by the selected compute node.

In one embodiment, considering that within the system architecture of the single storage backend, every time the compute node creates a virtual machine or generates an exported image file, whether the identity of the corresponding Ceph storage backend is consistent with the identity of the storage location of the image file included in the utilized image at a designated field of the image service is usually verified at the compute node. For example, the "fsid" of the Ceph storage backend associated with the compute node may be compared with the "fsid" included in the location field in the image service. When the same, operations of creating the virtual machine or performing image exporting may be allowed. Otherwise, the request may be rejected. This mechanism may only ensure that the compute service and the image service use the same storage backend in the case of the single storage backend. In the case of multiple storage backends, the mechanism may be obviously improper. Based on this, in one embodiment, when the compute node creates a virtual machine and generates an image file, verifying whether the identity of the compute node associated storage backend and the identity of the storage backend included in the location field of the utilized image in the image service are equal may be cancelled. Thus, creating a virtual machine or generating an exported image file may be supported in scenarios of multiple storage backends.

In one embodiment, it should be noted that, only one of the at least two storage backends may correspond to the image service. Other storage backends may not correspond to the image service. In scenarios of a single storage backend according to the existing technology, every time the virtual machine performs an image file exporting operation, the image service may obtain or verify the size of the exported image file from the storage backend. However, in scenarios of multiple storage backends according to the present disclosure, only one storage backend may correspond to the image service. When the virtual machine in the compute node associated with other storage backend generates an exported image file, because the other storage backend does not correspond to the image service, the image service may not obtain the size of the image from the storage backend, such that the image service may not obtain the image size and the exporting operation may be determined as failed. For example, the storage backend AZ1 and the storage backend AZ2 are currently available. The storage backend AZ1 may correspond to the image service while the storage backend AZ2 may not correspond to the image service. When the virtual machine in the compute node associated with the storage backend AZ2 generates an exported image file, if the approach of using the image service to acquire the image size in existing technology is used, the image service may attempt to obtain the image size from the storage backend AZ1 (because the image service only corresponds to the storage backend AZ1). Obviously, because the exported image file is generated in the availability_zone AZ2, it may be impossible for the image service to obtain the image size from the storage backend AZ1. In this case, the exporting operation may fail. Thus, in one embodiment, when the virtual machine performs an image file exporting operation, the compute service (rather than the image service) corresponding to the compute node which the virtual machine is running on may obtain the size information of the exported image file, and the compute service may send the size information to the image service. Thus, the image service may obtain the image size normally, thereby ensuring a smooth exporting operation.

Embodiment 2

Referring to FIG. 2, the present disclosure further provides a cloud platform. The cloud platform may include a plurality of compute nodes and at least two storage backends. Each compute node may run zero or a plurality of virtual machines. The cloud platform may include:

an association relationship establishment unit 100, configured to establish an association relationship between the compute nodes and the at least two storage backends, such that each compute node is associated with one and only one storage backend;

an image file type determination unit 200, configured to, when an image file is generated by a virtual machine in the compute node, determine a type of the image file, where the type of the image file includes a base image file or an exported image file; and an image file storage unit 300, configured to store the image file according to the type of the image file and the storage backend associated with the compute node that generates the image file.

In one embodiment, each storage backend is configured with an availability_zone, and correspondingly, the association relationship establishment unit may include:

an availability_zone allocation module, configured to allocate the compute nodes into respective availability_zones, such that each compute node may be allocated into one and only one availability_zone; and a parameter assignment module, configured to assign the parameter of each availability_zone to the respective compute node.

In one embodiment, the cloud platform may further include:

a target compute node determination unit, configured to select a changeable target compute node in the availability_zone, when the pre-configured compute node in the target availability_zone generates a virtual-machine-changing-compute-node operation; and a change unit, configured to change the virtual machine that generates the virtual-machine-changing-compute-node operation from the pre-configured compute node to the target compute node.

In one embodiment, the image file storage unit may include:

a base image file storage module, configured to, when the image file is a base image file, store the image file in every storage backend; and an exported image file storage module, configured to, when the image file is an exported image file, determine a storage backend associated with the compute node that generates the exported image file, and store the image file in the determined storage backend.

In one embodiment, the cloud platform may further include:

a type determination unit, configured to determine a type of the designated image file when a virtual machine is created according to the designated image file; and a virtual machine creation unit, configured to, when the designated image file is a base image file, select a compute node, and create a virtual machine by the selected compute node; and when the designated image file is an exported image file, select a compute node that has the same parameter of the availability_zone as the parameter of the availability_zone of the designated image file, and create a virtual machine by the selected compute node.

The sequence numbers of the foregoing embodiments of the present disclosure are merely illustrative and do not represent the advantages or disadvantages of the embodiments.

The embodiments of the cloud platform described above are merely exemplary, and units described as separate components may or may not be physically separated. The components shown as units may or may not be physical units, that is, may be located in one location, or may be distributed in a plurality of network elements. According to the actual requirements, a certain portion or all of the modules may be selected to achieve the objectives of the embodiments of the present disclosure. Those of ordinary skill in the art may understand and implement the disclosure without contributing creative work.

As such, the technical solutions provided by the present disclosure may configure at least two storage backends in the cloud platform, such that, when one of the storage backends fails, other storage backends may continue to operate normally to enhance the disaster tolerance of the cloud platform. In the cloud platform having at least two storage backends, the compute nodes may first be associated with different storage backends, such that each storage backend may correspond to compute node(s), respectively. When the compute node generates an image file, a specific type of the image file may be determined, and the image file may be stored differently according to the image file type. Specifically, in one embodiment, when the image file is a base image file, the image file may be stored in every storage backend. When the image file is an exported image file, the image file may be stored in the storage backend associated with the compute node that generates the exported image file. The purpose of such process is that the base image only includes the operating system in the ex-factory state from which any compute node may create a virtual machine, which results in the necessity to store the base image in every storage backend. The exported image file may include state of a certain user of the operating system running in the virtual machine. Thus, only the compute node associated with a same storage backend may create a virtual machine based on the exported image file, and the exported image file may only be stored in one storage backend. Based on this, through adding additional storage backends, the disaster tolerance of the cloud platform may be enhanced, and the storage capacity scale-out of the cloud platform made possible through adding new storage backends may not affect the online running virtual machines. Thus, the stability of the cloud platform may be ensured.

Through the descriptions of various aforementioned embodiments, those skilled in the art may clearly understand that the embodiments may be implemented by means of software in conjunction with an essential common hardware platform, or may be simply implemented by hardware. Based on such understanding, the essential part of the aforementioned technical solutions or the part that contribute to the prior art may be embodied in the form of software products. The software products may be stored in computer readable storage media, such as ROM/RAM, magnetic disk, and optical disk, etc., and may include a plurality of instructions to enable a computer device (may be a personal computer, a server, or a network device) to execute the methods described in various embodiments or parts of the embodiments.

The foregoing are merely certain preferred embodiments of the present disclosure, and are not intended to limit the present disclosure. Without departing from the spirit and principles of the present disclosure, any modifications, equivalent substitutions, and improvements, etc. shall fall within the scope of the present disclosure.

What is claimed is:

1. A construction method for a cloud platform including a plurality of compute nodes and at least two storage backend clusters, the construction method comprising:
   establishing an association relationship between the compute nodes and the at least two storage backend clusters, such that each compute node is associated with one and only one storage backend cluster, wherein the compute node is physical equipment having a data processing function and including a CPU (central processing unit) and memory;
   configuring at least one virtual machine in each compute node;
   in response to a virtual machine of a compute node generating an image file, determining a type of the image file, wherein the type of the image file includes a base image file and an exported image file; and
   storing the image file according to the type of the image file and the storage backend cluster associated with the compute node that generates the image file,
   wherein storing the image file includes:
      when the image file is the base image file, storing the image file in every storage backend cluster, and
      when the image file is the exported image file, determining the storage backend cluster associated with the compute node containing the virtual machine that generates the image file, and storing the image file in the determined storage backend cluster; and
   wherein the exported image file includes an operating state of an operating system running in the virtual machine and is stored in the storage backend cluster associated with the compute node generating the exported image file, such that only a compute node associated with the storage backend cluster in which the exported image file is stored creates a virtual machine based on the exported image file.

2. The construction method according to claim 1, wherein the storage backend clusters are configured with availability_zones, and correspondingly, establishing the association relationship between the compute nodes and the at least two storage backend clusters includes:
   allocating the compute nodes to the availability_zones, such that each compute node has one and only one availability_zone; and
   assigning a parameter of each availability_zone to the respective compute node.

3. The construction method according to claim 2, further including:
   when a number of storage backend clusters is greater than two, combining every two storage backend clusters, and configuring a different availability_zone for the combined storage backend cluster.

4. The construction method according to claim 2, further including:
   when a pre-configured compute node in a certain availability_zone generates a virtual-machine-changing-compute-node operation that changes the virtual machine from one compute node to another compute node, selecting a changeable target compute node from the availability_zone;
   changing the virtual machine that generates the virtual-machine-changing-compute-node operation from the pre-configured compute node to the target compute node.

5. The construction method according to claim 1, before storing the image file in every storage backend cluster, the method further including:
   adding an availability_zone attribute to the base image file, and configuring a value of the availability_zone attribute to be none.

6. The construction method according to claim 1, further including:
   when creating the virtual machine according to a designated image file, configuring a filter to determine a type of the designated image file;
   when the designated image file is a base image file, selecting any compute node, and creating the virtual machine by the selected compute node;
   when the designated image file is an exported image file, selecting a compute node that has the same availability_zone parameter as the availability_zone parameter of the designated image file, and creating the virtual machine by the selected compute node.

7. The construction method according to claim 1, before storing the image file in the determined storage backend cluster, the method further including:
   determining a parameter of an availability_zone corresponding to the compute node that generates the image file; and
   adding an availability_zone attribute to the image file, and configuring a value of the availability_zone attribute to be the parameter of the availability_zone.

8. The construction method according to claim 1, further including:
when the compute node creates a virtual machine and generates the image file of the virtual machine, canceling a step at the compute node for verifying whether an identity of the storage backend cluster corresponding to the compute node is consistent with an identity of the storage backend cluster included in a designated field of a utilized image in image service.

9. The construction method according to claim 1, further including:
when an operation to export the image file is executed by the virtual machine, obtaining a size information of the exported image file.

10. A cloud platform, wherein the cloud platform includes a plurality of compute nodes and at least two storage backend clusters, and each compute node is, configured with at least one virtual machine, the cloud platform comprising:
an association relationship establishment unit, configured to establish an association, relationship between the compute nodes and the at least two storage backend clusters, such that each compute node is associated with one and only one storage backend cluster;
an image file type determination unit, configured to, in response to an image file being generated by a virtual machine in the compute node, determine a type of the image file, wherein the type of the image file includes a base image file or an exported image file, and
an image file storage unit, configured to store the image file according to the type of the image file and the storage backend cluster associated with the compute node containing the virtual machine that generates the image file, wherein:
the image file storage unit includes:
a base image file storage module, configured to, when the image file is a base image file, store the image file in every storage backend cluster; and
an exported image file storage module, configured to, when the image file is an exported image file, determine a storage backend cluster associated with the compute node containing the virtual machine that generates the exported image file, and store the image file in the determined storage backend cluster, and
the association relationship establishment unit, the image file type determination unit, and the image file storage unit each is implemented by means of software in conjunction with a hardware platform, or is implemented by hardware.

11. The cloud platform according to claim 10, wherein each storage backend cluster is configured with an availability_zone, and correspondingly, the association relationship establishment unit includes:
an availability_zone allocation module, configured to allocate the compute nodes into respective availability_zones, such that each compute node is allocated into one and only one availability_zone; and
a parameter assignment module, configured to assign a parameter of each availability_zone to the respective compute node.

12. The cloud platform according to claim 11, further including:
a target compute node determination unit, configured to select a changeable target compute node in the availability_zone, when the pre-configured compute node in the target, availability_zone generates a virtual-machine-changing-compute-node operation; and
a change unit, configured to change the virtual machine that generates the virtual-machine-changing-compute-node operation from the pre-configured compute node to the target compute node.

13. The cloud platform according to claim 10, further including:
a type determination unit, configured to determine the type of the designated image file when a virtual machine is created according to the designated image file; and
a virtual machine creation unit, configured to, when the designated image file is a base image file, select a compute node, and create the virtual machine by the selected compute node; and
when the designated image file is an exported image file, select a compute node that has the same availability_zone parameter as the availability_zone parameter of die designated image file, and create the virtual machine by the selected compute node.

* * * * *